(12) United States Patent
Ibbotson et al.

(10) Patent No.: US 7,715,547 B2
(45) Date of Patent: May 11, 2010

(54) VOICE XML NETWORK GATEWAY

(75) Inventors: Richard W. Ibbotson, Fairport, NY (US); Daniel Gallagher, Fairport, NY (US); Michael Thorpe, Fairport, NY (US); Bruce VanGelder, Clifton Springs, NY (US); Luther Wright, Brockport, NY (US)

(73) Assignee: Soleo Communications, Inc., Rochester, NY (US)

( * ) Notice: Subject to any disclaimer, the term of this patent is extended or adjusted under 35 U.S.C. 154(b) by 1671 days.

(21) Appl. No.: 10/867,231

(22) Filed: Jun. 14, 2004

(65) Prior Publication Data

US 2005/0276391 A1 Dec. 15, 2005

(51) Int. Cl.
*H04M 3/00* (2006.01)
(52) U.S. Cl. .................................. 379/265.02; 379/352
(58) Field of Classification Search .............. 379/88.18, 379/93.17, 265.01–266.09; 370/352–356
See application file for complete search history.

(56) References Cited

U.S. PATENT DOCUMENTS

| | | | | |
|---|---|---|---|---|
| 5,884,262 | A * | 3/1999 | Wise et al. | 704/270.1 |
| 6,011,844 | A * | 1/2000 | Uppaluru et al. | 379/220.01 |
| 6,600,736 | B1 * | 7/2003 | Ball et al. | 370/352 |
| 6,922,411 | B1 * | 7/2005 | Taylor | 370/401 |
| 7,031,724 | B2 * | 4/2006 | Ross et al. | 455/456.1 |
| 7,058,164 | B1 * | 6/2006 | Chan et al. | 379/88.17 |
| 7,099,451 | B1 * | 8/2006 | Jordan et al. | 379/212.01 |
| 7,103,172 | B2 * | 9/2006 | Brown et al. | 379/266.01 |
| 7,127,400 | B2 * | 10/2006 | Koch | 704/270.1 |
| 7,142,661 | B2 * | 11/2006 | Erhart et al. | 379/265.09 |
| 7,222,301 | B2 * | 5/2007 | Makagon et al. | 715/727 |
| 7,242,752 | B2 * | 7/2007 | Chiu | 379/88.04 |
| 7,263,177 | B1 * | 8/2007 | Paterik et al. | 379/88.18 |
| 7,286,985 | B2 * | 10/2007 | Chiu | 704/260 |
| 7,330,899 | B2 * | 2/2008 | Wong | 709/230 |
| 7,515,695 | B1 * | 4/2009 | Chan et al. | 379/88.18 |
| 2003/0005076 | A1 * | 1/2003 | Koch et al. | 709/217 |
| 2003/0212558 | A1 * | 11/2003 | Matula | 704/260 |

FOREIGN PATENT DOCUMENTS

| | | | | |
|---|---|---|---|---|
| KR | 20040026935 | A | * | 4/2004 |
| WO | WO 0230094 | A2 | * | 4/2002 |

OTHER PUBLICATIONS

Peter J. danielsen,The promise of a voice-enabled webAug. 2000,IEEE,Software Technology,p. 104-106.*
Voice XML Forum, Version 1.00, Mar. 7, 2000,Copyright 2000,pp. 1-101.*

* cited by examiner

*Primary Examiner*—Simon Sing
(74) *Attorney, Agent, or Firm*—Hulsey, P.C.

(57) ABSTRACT

A system (10) for controlling telecommunications calls includes a voice XML network gateway (12) including a voice interpreter module (20) and a call center server module (28) association with a telecommunications switch (58). The voice interpreter module (20) receives voice telecommunications signals, and the call center server module (28) receives call center telecommunications data signals. Interpreting circuitry (22, 24) interprets the voice telecommunications signals using the voice interpreter module in association speech recognition application (s) (16). Call center service providing (18) means provides call center service in response to the call center telecommunications data signals in association with call center application program(s). Control circuitry (26) associated with the telecommunications network server (12) controls the interpreting circuitry (20) and the call center providing means (28) in response to the flow of telecommunications calls from the telecommunications switch (58) according to the capabilities of the at least one speech recognition application (16) and the at least one call center application program (18).

20 Claims, 5 Drawing Sheets

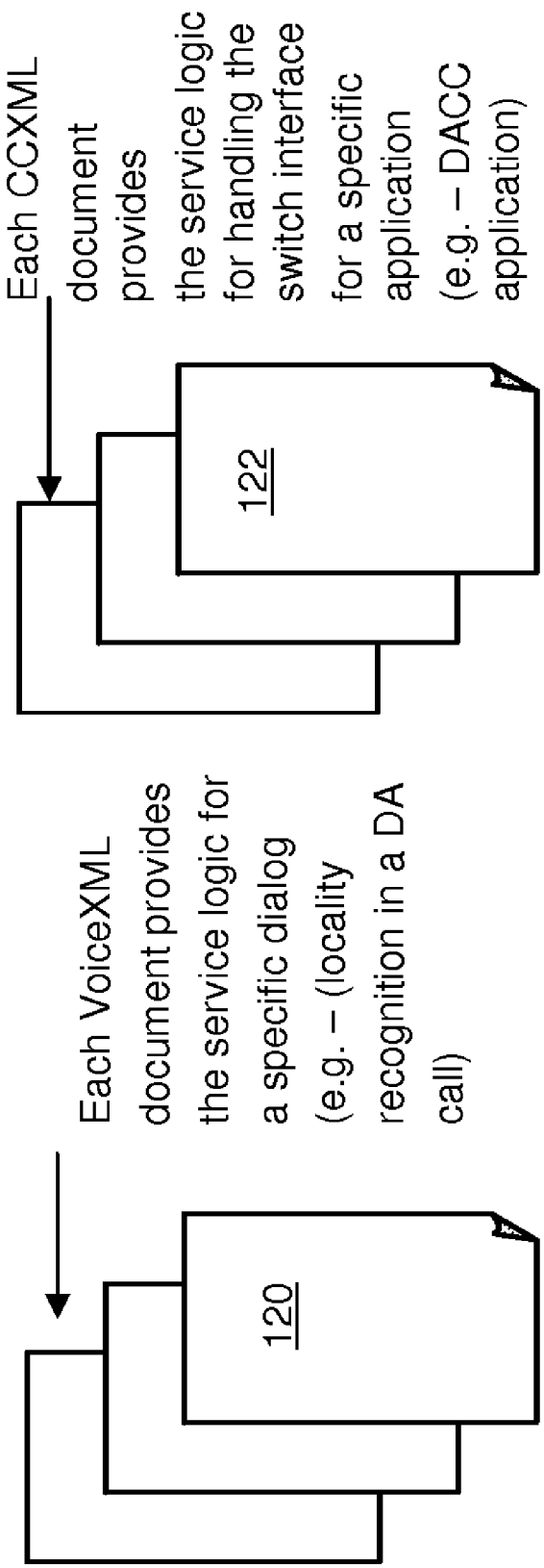

VOICE XML NETWORK GATEWAY

FIELD OF THE INVENTION

This invention pertains to telecommunications systems and methods of operation and, more particularly, to a VoiceXML network gateway residing independently from switching circuitry.

BACKGROUND OF THE INVENTION

Call centers are under increasing pressure to provide high-quality service while controlling costs. Call center systems must be highly reliable since availability of the customer support service is critical. As call centers handle increasing volumes of incoming calls, the call routing solution must be scalable so it can expand to include additional locations, as well as capable of rapidly integrating new technologies.

A growing trend in carrier-grade telecommunications systems has been the evolution away from centralized call control applications to more distributed architectures. This has been described as moving the intelligence "to the edge of the network," in that the call features that historically have been programmed into a hardware switch are now well separated from the switch that handles the call. This trend has been enabled by the availability of architectures such as the NORTEL® Advanced Intelligent Networks (AIN) and similar architectures, which separate feature creation and processing activities from the normal call-processing activities of a switch and move these activities to a central location shared by many switches.

In such an environment, there is the need for increased automation in call centers in the United States.

Moreover, there is a need for a method and system that economically and effectively integrates the telephone company operator and call center services.

There is a further need for a suite of independent systems integrated into an open software-based solution for user contact automation that combines advanced network call control, speech recognition and agent-backed integration.

BRIEF DESCRIPTION OF THE DRAWINGS

For a more complete understanding of the XML network gateway and advantages thereof, reference is now made to the following description which is to be taken in conjunction with the accompanying drawings and in which like reference numbers indicate like features and further wherein:

FIG. 5 portrays aspects of a VoiceXML document useful in the system of the present invention; and FIG. 6 portrays aspects of a Call Control XML (CCXML) document useful in the system of the present invention.

DETAILED DESCRIPTION OF THE INVENTION

Figure 1:
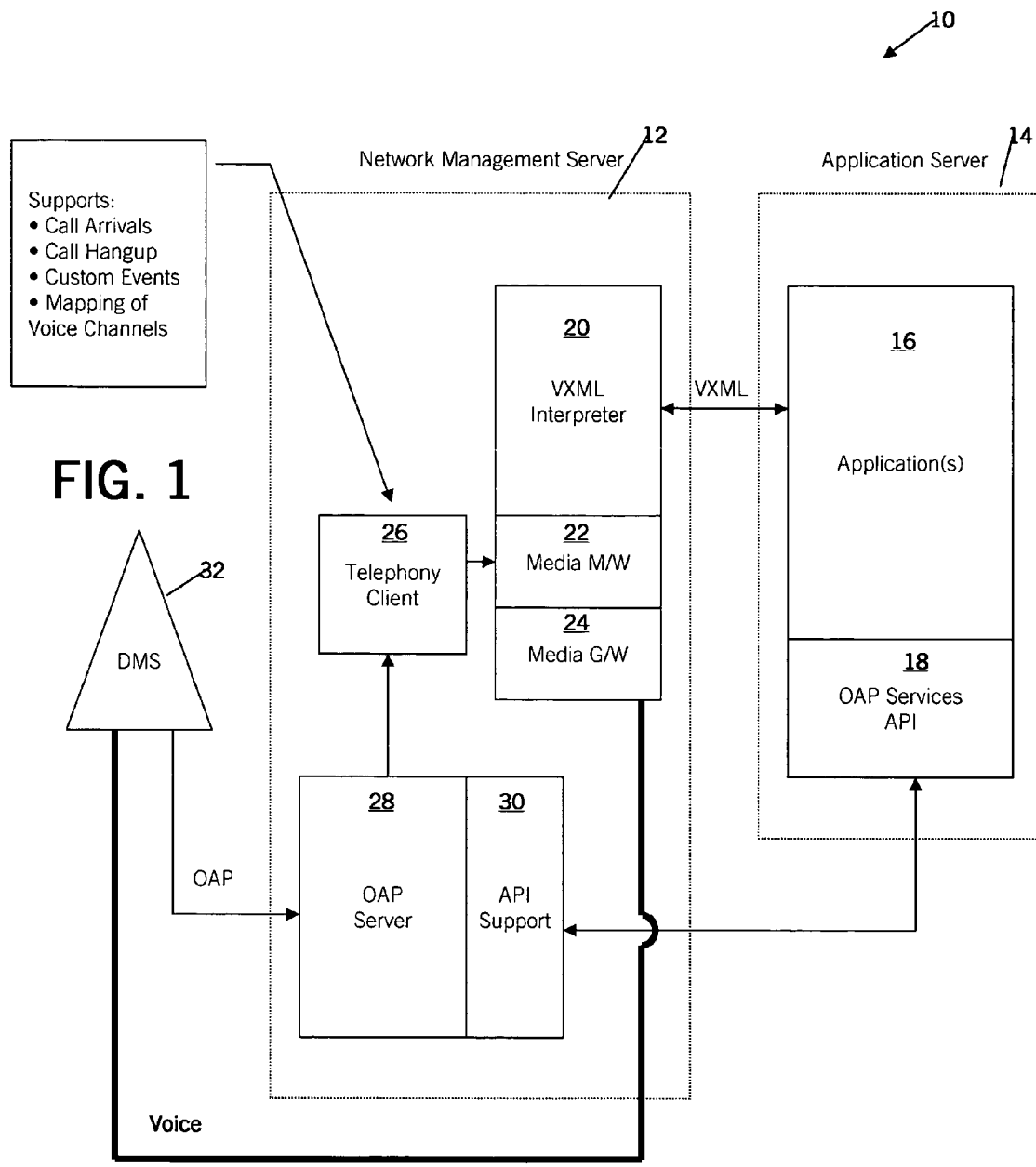
FIG. 1 provides a conceptual view of the high level system architecture of the XML network gateway of the present invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The XML network gateway is an open, purpose-built solution that lets the user easily introduce new services without having to replace the existing network infrastructure. In addition, the XML network gateway "future-proofs" the applications from network evolution) to ensure their operation within the existing infrastructure. The present invention provides, as a software-based solution, a VoiceXML network gateway that is an open, scalable framework. The XML network gateway provides extensive interface capabilities to connect with legacy and next-generation networks, as well as an open and extensible applications development environment based on industry-leading Internet applications standards. The present invention provides the ability to seamlessly pass call context information from either internal or external sources to the caller through agent handling or automated techniques. Moreover, the present invention presents to the user a plurality of multi-level security agents that control how and when network resources are made available to applications. The XML network gateway also provides administrative services with real-time service management capability and multi-applications support The XML network gateway architecture is based on the open standards of the World Wide Internet application Consortium (W3C) providing carriers with an application—independent approach to network integration. As a result, network resources are under the control of the application developer using standards that are common in Internet application development. This means independence from proprietary systems that can restrict the user and the user's information, as well as independence from proprietary call control interfaces. So the user can pave the way for lucrative advances in information delivery and speech recognition technology.

Moreover, the present invention allows the user to access a variety of legacy and new databases that exist both internally and externally to the public network. These databases may include directory assistance databases, personal directory listings, self-help and other knowledge-based databases, enhanced services databases, line information repositories, calling card and credit card verification, real time ratings, number portability databases, operator reference databases, caller preference databases, and customer records. The present invention makes these databases accessible through XML communications that allow applications to use the same design and retrieval methods regardless of the information to be accessed.

Just as a user's PC uses an Internet browser to access a variety of Internet applications services, the present invention provides a call control "browser" to access a variety of call center applications. The browser uses industry-standard Internet application development tools and techniques to allow independent and ubiquitous access to a host of new services. Web-based applications integrated into the call center with the present invention may also include support for multi-party conferencing, plus more advanced conference and audio control, as well as the ability to give each active call leg its own dedicated and personalized automation dialog. The present invention, furthermore, provides for multiple-call handling and control, including the ability to place outgoing calls, and the ability to receive events and messages from external databases and systems.

The present invention, furthermore, allows system integrators to tie various network elements into one, cohesive system. By moving service logic and network control out to the application endpoints, the user may easily introduce new services without having to replacing an existing network infrastructure. The present invention permits the building of applications through industry-standard markup languages—the same ones millions of Internet application developers use every day. As a result, the user can introduce new services or make changes easily using common web-based techniques. With the present invention, call control is managed by the application for even greater network and agent efficiency. Information captured from the caller is maintained throughout the call, even when calls are handed from an automated speech recognition system to a live agent.

The present invention, furthermore, aids both inbound and outbound call centers to put a wide variety of information databases in operation cooperatively. These may include knowledge-based databases, customer relationship databases, product and warranty databases, and demographic profile databases. Using standard Web-based tools, the voice XML network gateway of the present invention, offers enterprise customers the ability to provide next-generation applications without the difficulties of traditional network integration complexities.

The present invention also provides a framework to develop advanced voice applications that transform the telephone into a powerful tool to access Web-based information. As the industry moves towards voice over IP standards using protocols such as SIP, the XML network gateway of the present invention can separate the business application from the voice infrastructure, allowing off-the-shelf components and standards-based technology to be used to quickly develop new services.

In another aspect of the invention, there is provided a voice XML network gateway as an open, purpose-built solution that allows users to introduce new services without having to replace existing network infrastructure. The present invention links web-based automation and information delivery technology to the advanced protocols in telecommunications networks, to provide a system for remotely controlling telecommunications calls from a telecommunications switch associated with a telecommunications network.

The XML network gateway, furthermore, includes a telecommunications network server with a voice interpreter module and a call center server module. This next section sounds like it's a h/w device (circuitry, signals, etc) The voice interpreter module receives a plurality of voice telecommunications signals from the associated telecommunications switch. The call center server module is associated with the telecommunications network server to receive a plurality of call center telecommunications data signals from the associated telecommunications switch. Interpreting circuitry interprets the voice telecommunications signals using the voice interpreter module in association with at least one speech recognition application. The call center server module provides at least one call center service in response to the call center telecommunications data signals. Control circuitry associated with the telecommunications network server controls the interpreting circuitry and the call center providing means in response to the flow of telecommunications calls from the telecommunications switch. This control is achieved according to the capabilities of the at least one speech recognition application and the at least one call center application program.

FIG. 1 provides a conceptual view of a system architecture for the XML network gateway of the present invention. FIG. 1, in particular, shows architectural diagram 10 for implementing the teachings of the present invention. Architecture diagram 10 includes XML network server 12 and applications server 14. Applications server 14 includes a number of applications 16 and services such as those of using the NORTEL Open Automated Protocol® (OAP®) services 18. The NORTEL OAP® provides an open protocol used for communications between a NORTEL DMS TOPS switch and NORTEL Intelligent Service Nodes® in an Intelligent Services Environment®. The NORTEL DMS® or Digital Multiplex System® includes a line of digital switches for local, long distance, and international traffic, including a DMS TOPS (Traffic Operator Position System switch).

Voice XML network server 12 includes voice XML interpreter 20 which associates with media middleware 22 and media gateway 24. Telephony client 26 provides input to media middleware 22. OAP server 28 associates with API (application programming interface) support 30 and provides input to telephony client 26. API support 30 within voice XML network server 12 provides a set of programming tools and interfaces that permits software engineers to create custom applications for the NORTEL IWS® (NORTEL Intelligent Workstation®) workstation and communicates with OAP services API 18 of voice XML network server 12. OAP server 28 receives input from DMS switch 32. DMS switch 32 provides voice communication to media gateway 24. As shown in FIG. 1, telephony client 26 within voice XML network server 12 supports call arrivals, call hang-up, custom events and mapping of voice channels.

Figure 2:
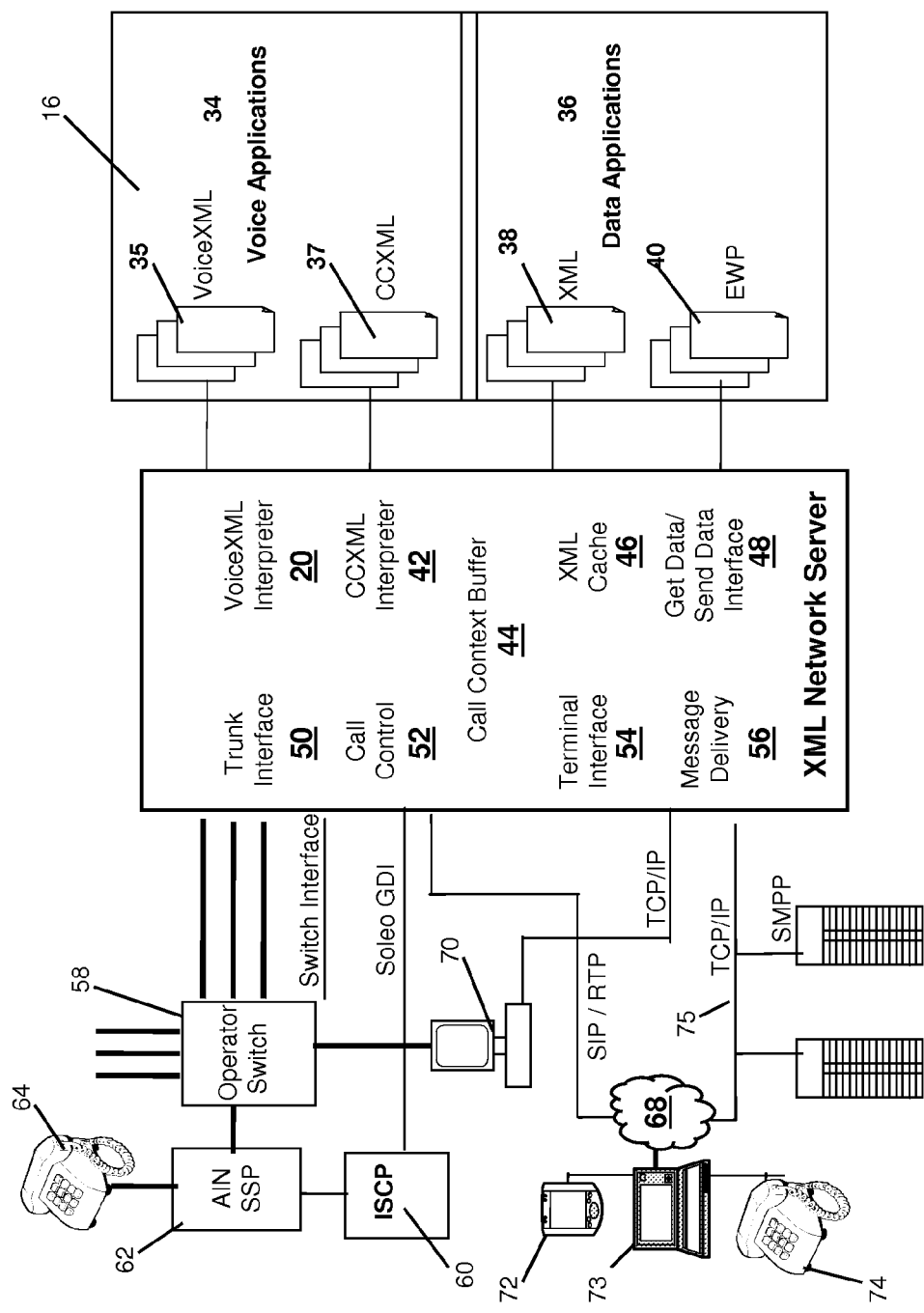
FIG. 2 shows a block diagram of one embodiment of the XML network management server of the present invention.

FIG. 2 shows a block diagram of one embodiment voice XML network server 12 as the voice XML network management server of the present invention. Voice XML network server 12 may include a number of devices and software that support the method and functions system of the present invention. Voice XML network server 12 interfaces applications 16, which include voice applications 34 and data applications 36. Voice applications 34 may include voice XML applications 35 and CCXML applications 37. Data applications may include XML applications 38 and EWP applications 40.

Components supporting voice XML network server 12 include voice XML interpreter 20, CCXML interpreter 42 and call context buffer 44. Call context buffer 44 is supported by XML cache 46 and get data/send data interface 48. To permit an interface with a standard switching circuit, voice XML network server 12 provides a number of interfaces. These may include trunk interface 50 and call control interface 52. Moreover, voice XML network server 12 includes terminal interface 54 and message delivery interface or functionality 56. Trunk interface 50 connects to operator switch 58 for provide a trunk and switch interface function. Call control interface 52 provides an interface to ISCP 60 which, as well as operator switch 58, connects to AIN SSP 62 to communicate with individual phone 64. Operator switch 58 also interfaces with call center computer 70 which communicates messages with message delivery interface 56. Call control interface 52, through SIP/RTP Internet connection 68 provides input for data connections to, for example, computer 73, wireless device 72, or separate phone 74. In addition, via message delivery interface 56 using TCP/IP connection 75, voice XML network server 12 may provide input to e-mail server 76 and session management subsystem (SMS) server 78.

Figure 3:
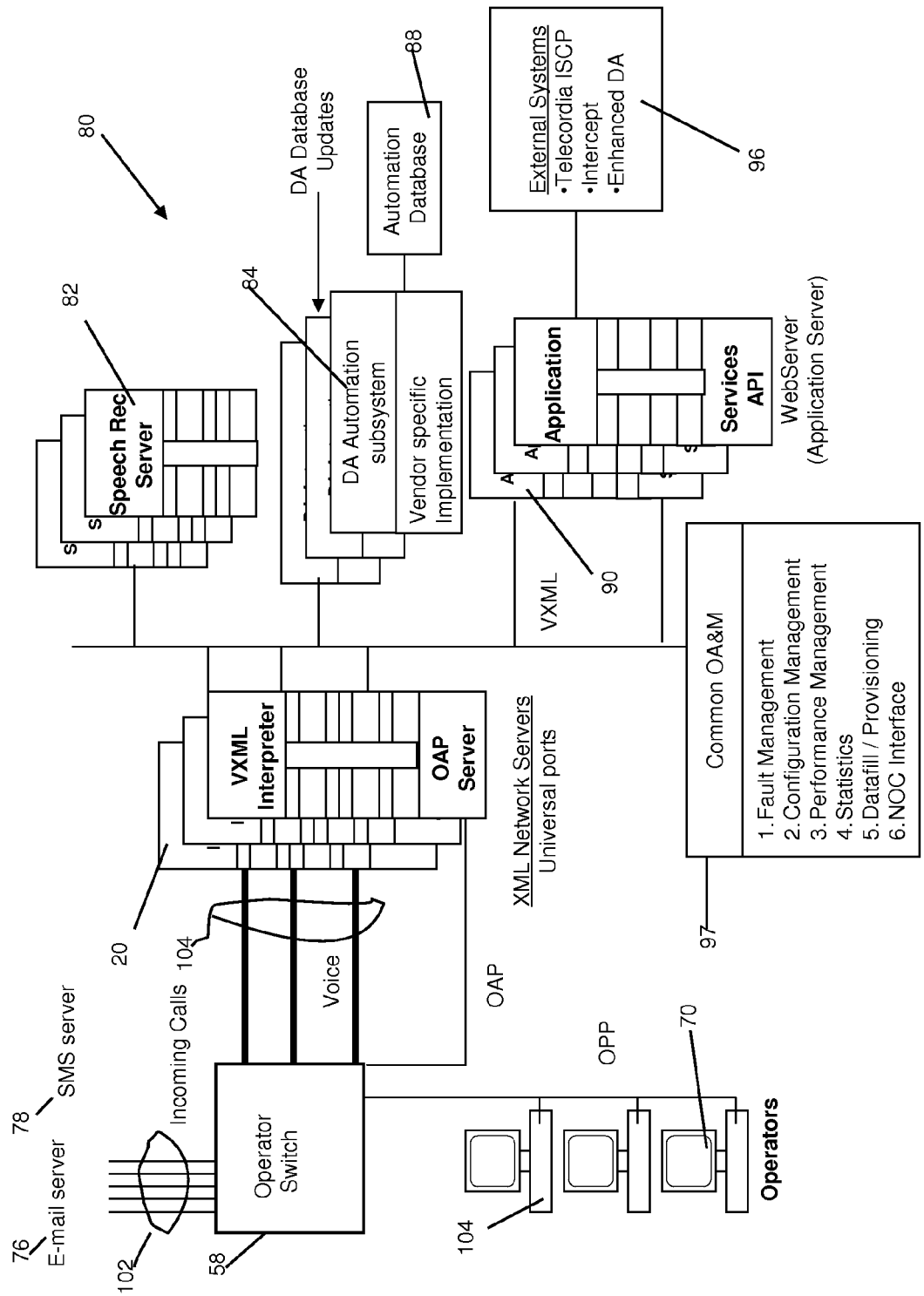
FIG. 3 depicts the call center services physical application architecture of the present invention.

FIG. 3 depicts the call center services physical application architecture 80 of the present invention for communicating voice and data within a voice XML environment established by the present invention. In architecture 80, software applications 16 include applications that may support speech recognition server 82 and directory assistance automation subsystem 84. Directory assistance automation subsystem 84 accesses vendor specific features 86 and automation database 88. In addition, voice XML scripting language enables use of Internet applications server 90 for various applications 92 and services APIs 94. Through Internet applications server 90, many external systems 96, such as the Telecordia ISCP, intercept functions, and/or enhanced directory assistance may be accessed. Also common call center and management functions 97 are provided to voice XML network server 12. All of this functionality and structure is made available to incoming calls from switch 58 via lines 98 to voice XML interpreter 20 and OAP connection 100 to OAP gateway 28 of voice XML network server 12. Switch 58 receives incoming calls via lines 102 and further connects to operators 104 using computers 70 within a call center.

Figure 4:
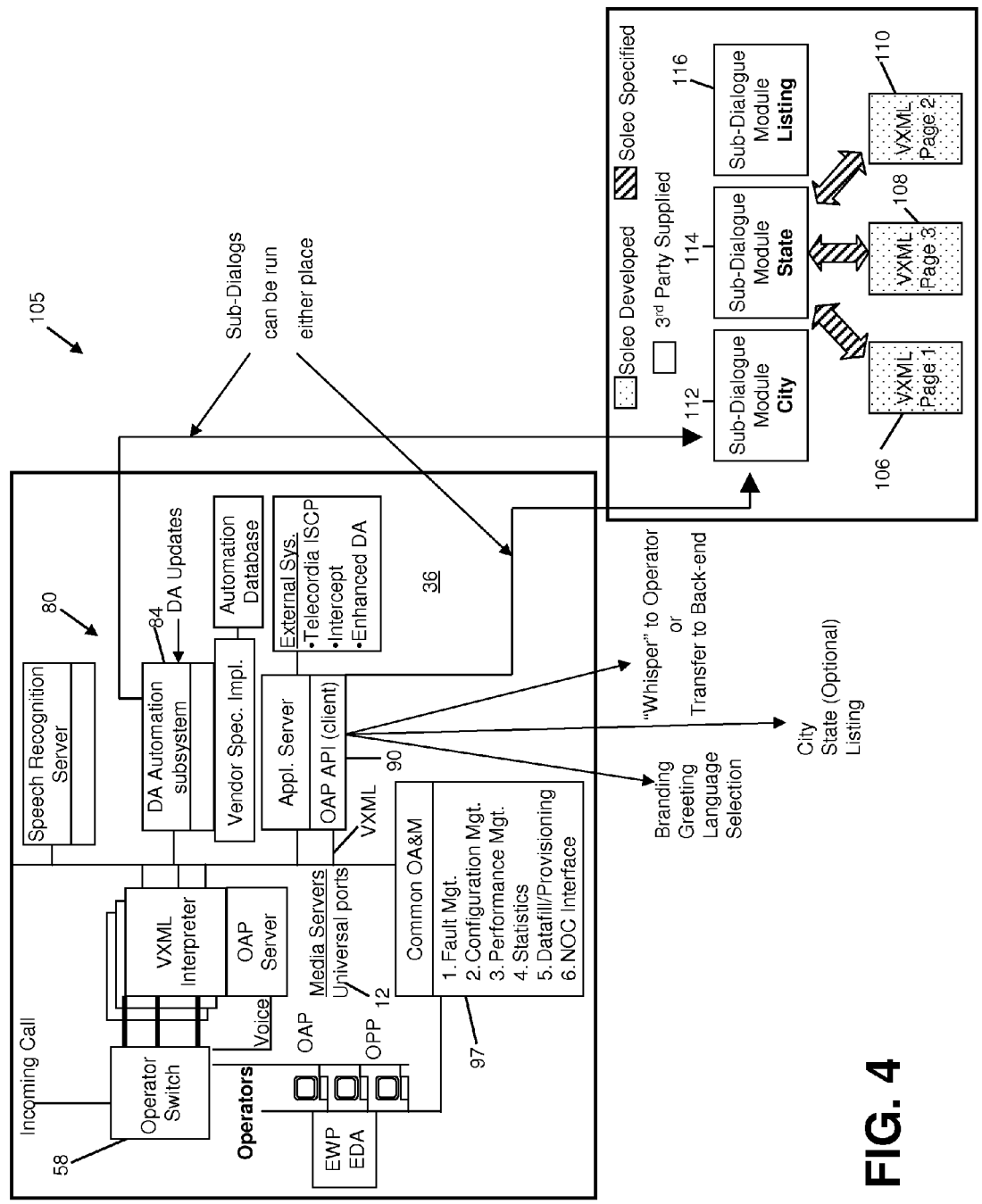
FIG. 4 depicts the directory assistance automation application architecture for one embodiment of the present invention.

FIG. 4 depicts the directory assistance automation software application architecture 105 for one embodiment of the present invention. These may include a branding grading language selection voice XML page 106, a city or state listing voice XML page 108, as well as a "whisper" to operator function voice XML page 111 that provides to the operator a whisper or a transfer to a back-end function. Listing voice XML page 108 provide associations with different sub-dialogue modules such as city sub-dialogue module 112, state sub-dialogue module 114, and listing sub-dialogue module 116. These sub-dialogue modules 112, 114, and 116 may have the ability to be run either through the listing voice XML page 108, for example, or directly from the web-based OAP API server client 90, or even further directly through the DA automation subsystem 84.

FIGS. 5 and 6 show conceptual diagrams referring to the constitution of voice XML documents 120 and CCXML documents 122. As indicated in FIG. 5, each voice XML document 120 provides the service logic for a specific dialogue. Voice extensible Markup Language (voice XML) documents 120 enable the functionalities of (1) spoken prompts (synthetic speech), (2) output of audio files and streams, (3) recognition of spoken words and phrases, (4) recognition of DTMF input, (5) recording of spoken input, and (6) control of dialog flow. The Call Control extensible Markup Language (CCXML Documents) documents 122, which are conceptually depicted in FIG. 6, in contrast, provide the service logic for handling the switch interface for a specific application. CCXML documents allow (1) routing of calls to the next available line, agent or location, (2) handling of both incoming & outgoing calls; (3) multi-party conferencing, bridging & transferring; (4) signaling & message handling; (5) selective call answering and dialog execution.

Voice XML network server 12 of the present invention is based on the open standards of the World Wide Web Consortium (W3C) providing carriers with an application-independent approach to network integration. As a result, network resources are under the control of the application developer using standards that are common in Internet application development.

The voice XML network server 12 provides a significant level of application independence. For example, just as personal computers use an Internet browser to access a variety of Internet applications services, voice XML network server 12 provides a call control "browser" to access a variety of call center applications. The browser uses industry-standard Internet application development tools and techniques to allow independent and ubiquitous access to a host of new services. With the present invention, Web-based applications may be integrated into the call center with a variety of new features, including support for multi-party conferencing, plus more advanced conference and audio control. Voice XML network server 12 also allows each active call leg its own dedicated and personalized automation dialog, as well as multiple-call handling and control, including the ability to place outgoing calls, and the ability to receive events and messages from external databases and systems.

Standardization of all components ensures that applications deliver maximum efficiency and flexibility. Voice XML network server 12 permits the integration support required for all call control applications to work together, regardless of the database program, operating system or platform in which they reside. These applications may be built by the enterprise or call center services clients directly or through third-party application partners.

With systems maintenance and support services, users are able to attain value from a number of technical advantages. First of all, the present invention provides a high-quality support structure, including user problem reports, mechanized tools for diagnostics and maintenance, consistent on-site coverage, and 24×7 technical support. Moreover, the user has the ability to operate at peak efficiency and quality of service the end users demand, as well as reduce operational expenses associated with recruiting, training, and retaining skilled maintenance personnel.

Voice XML network server 12 takes advantage of these new possibilities to separate the intelligence of the features and applications from the network infrastructure. This framework allows new features and applications to be easily introduced without modification to existing network infrastructure, and provides applications in the framework with seamless access to stored information relevant to the call. An important difference between the voice XML network gateway and other feature servers is the level of support for complex applications and the additional functionalities provided to applications running in the framework.

Voice XML network server 12 provides a three-part modular architecture designed around current open standards. The three components in this framework separately manage network-specific tasks, resources available to applications running in the framework, and a remotely-accessible bundle of information relevant to the current call, or session. The interworking of these three components, and the support and functionality they expose to applications represents the core of the voice XML network gateway. Applications or features in this framework are differentiated purely on a basis of complexity. Any application or feature may be visualized as existing outside the framework and interacting with it through the exchange of voice XML documents 120 and CCXML documents 122.

Voice XML network server 12 provides a network management subsystem for managing the network-specific aspects of a call in the framework. This involves handling call setup and tear-down tasks, as well as providing an interface to call control applications which is independent of the network switching environment. By isolating call control applications from the specifics of the network, they become immediately portable across switching environments.

The network management subsystem supports an array of network switching protocols: Nortel/OSSAIN switch, SS7/

ISUP, PRI, SIP and H.323. The call control interface is exposed to applications using the Internet applications standard CCXML documents 122. The use of a Internet application programming model provides several advantages over more tightly integrated architectures, most notably simplified scaling and increased flexibility for call control applications.

Since a call control application running in the framework controls the call by providing XML documents as a response to an HTTP request, the server that provides the CCXML document 122 may be located anywhere on the IP network, and may be distributed across several servers. This drastically simplifies the provisioning of new applications into the framework, and allows this component to be scaled by the simple addition of more applications servers. The specification of a specific call control application in this framework is also reduced to the specification of an "initial page" URL. Since the Internet application programming model places no restrictions on call control applications architecturally or in terms of programming language, applications running in the framework may be static XML documents, or dynamically generated documents created by a distributed set of active Internet application pages.

In operation of voice XML network server 12, a CCXML document 122 may request voice XML interpreter 20 to start a voice XML interpreter session on a specific call leg, and control may be returned to the invoking CCXML document 122 in a method roughly analogous to the return from a subroutine call (or a sub-dialog call in voice XML).

Information collected from the caller (or from other sources) may be returned at this stage, and used by the calling CCXML application to determine call behavior. Using the CCXML document offers call control functionality that does not exist in voice XML, such as acceptance/rejection of an incoming call, initiation of new outbound call legs, and conference creation and management. Voice XML network server 12 interfaces with the switching environment through the use of a media gateway 24 and switching gateway 26, which insulates voice XML network server 12 from certain network specifics.

The voice applications 34 provide a modular framework for applications accessing resources such as speech recognition 82 and other TTS resources, applications servers, media servers and network resources (such as outbound call circuits). Specific resources are allocated by the resource management subsystem upon request on the basis of existing traffic and resource availability. The resource management subsystem maintains a database of information regarding availability and usage of all resources currently provisioned in the framework, and may raise system alarms in the event of resource unavailability.

The resource management subsystem may also perform call re-distribution in high call-volume situations. The centralization of this "traffic control" functionality allows a consistent response to resource outages at the level of the framework.

The actions of the resource management subsystem are largely transparent to a call control application. When a new call is presented to the framework, the network management subsystem acquires the initial resources to handle the call from the resource management subsystem. At this point, the access control role of the resource management subsystem is executed out in concert with the primary control application, which is the first resource allocated for a new call. Upon its initial invocation for a call, the primary control application acquires a unique session key from the session management subsystem, which is described herein below. Persistent information is then loaded into the session and used to determine the required behavior for the call.

At this point, the behavior of the call may be determined on a tenant-by-tenant basis before the presentation of the initial voice dialog. A tenant object represents customer specific data elements that represent the specific application level characteristics (call control only, not dialogue control) that are applied to a call for this particular customer. For example, a telecommunications company may desire to sell an automation directory service to two customers, each of which having different prompts and call flows. The parameters that specify the call control aspects of this are represented in the tenant object and its various methods. The required resources for the call are then determined and allocated via the resource management subsystem, and the appropriate secondary control application (CCXML or voice XML application) is then started and acquires control of the call.

From this point on, the primary control application interacts with any of the secondary control applications, allowing any new CCXML or voice XML application to be added to the framework without any modification. New applications may control network resources, handle the call, and return control to the master control application at any time. Control over access to resources is performed by the resource management subsystem at request time, including resources requested by the primary control application. In this way, the primary control application is not substantially different from any other call control application running in the framework. It is merely the first application to handle the call. However, the primary controller may use platform extensions supported by the present invention to perform the initial query to the session management subsystem. This allows a more complete centralization of the resource management subsystem functionality.

As described above, call control applications are insulated from the specifics of the switching environment by the network management subsystem. The network management subsystem is itself insulated from a large fraction of the switching environment by the call normalization layer. This layer translates incoming calls on the PSTN into SIP calls by the combination of a media gateway and a signaling gateway. The signaling gateway translates incoming signaling information into SIP messages, as well as translating SIP messages from the network management subsystem into protocol-specific call control messages.

Call context information present when a call is presented to the system is also placed into the initial SIP invite message. This normalization process allows the incorporation of PSTN-based call legs and VoIP call legs in the same system, at the same time shielding the network management subsystem from knowledge of the circuit-networking protocols. This behavior is similar to the functionality supplied by a software based switching mechanism, which are known in the art.

In this translation process, the audio data is converted into an RTP stream by media gateway (at which the incoming trunks terminate) 24. The network management subsystem communicates with the media gateway as required by the application executing in the framework, in order to provide access to the audio streams. For call control applications, the network management subsystem also communicates with a media controller in cases where the application requests manipulation of the audio stream (e.g. creation of a conference). This media controller is a component that directly handles multiple-call-leg media operations (mixing of audio streams) as well as single-call-leg operations (such as muting a specific audio stream). The present invention may also support other related operations.

The distributed nature of the voice XML network gateway allows the capacity of most components in the system to be increased by adding more instances of the component that is limiting the capacity. For example, more network management subsystem resources may be added to the system by configuring and adding a new network management subsystem node to the system. The new network management subsystem node receives call origination information from the signaling gateway and communicates with the media gateway and resource manager as needed. The extent to which the framework may be scaled this way is limited by processes which perform coordination between components. Such coordinating processes essentially break the distributed nature of the architecture, since the amount of work done by a coordinating process will increase as more coordinated components are added to the system.

Coordination of call control and media packets between the network management subsystem 12, media gateway 24 and signaling gateway 30 is not a problem for scalability, however, since the coordination is performed by the network management subsystem (provided that the capacity remains below the limits of the signaling gateway). The addition of a new network management subsystem introduces a new coordinating process, thus handling the additional load with a new component. For this reason, the addition of media gateways to the system will in general require the addition of new network management subsystem modules. The resource management and session management subsystems, however, perform coordinating activities across all systems in the framework. The ability of these components to respond to handle requests imposes the real limitation on scalability of the system. If so, the present invention accommodates the creation of a set of resource management and session management systems working under a coordinator chosen by election.

For example, the addition of new applications servers and more complex applications may increase the load in the network management subsystem as the amount of signaling-related traffic increases. As a result, the limits of call handling for a given configuration will depend on the complexity of the applications running in the framework. For this reason, the monitoring capabilities of the resource management subsystem, which allow the load on the various components to be monitored during such configuration changes, provide vital information during provisioning of new applications and expansion of existing applications/features. In smaller deployments, various servers in the architecture may actually be collocated, to the extent that the system retains sufficient redundancy to protect against single system failures. Excessive co-location of resources will increase the fragility of the system in the event of a resource failure.

Reliability in the voice XML network gateway 10 is defined in terms of system availability for a new call attempt. In the event of a resource failure, individual calls may be lost, i.e., prematurely terminated. However, the system 10 should remain available to handle a new call, even in the event of a resource failure. It is assumed that the frequency with which resource failures occurs is low, so that the expected percentage of calls lost is minimal.

High reliability is achieved in a hardware switch by a high level of built-in redundancy of components in DMS switch 32. High reliability in the voice XML network gateway 10 is a result of the distributed nature of the framework. A distributed environment offers an "economy of scale" by nature of the number of independent, functionally identical components in the system. The loss of a single hardware component out of a group will not reduce system availability if the system is provisioned with a sufficient number of such hardware components. As with system scalability above, the exception to this rule is components which perform coordination between systems, as such components by definition exist in small number.

The need for a redundant backup system is highest for media gateway 24, as an unrecoverable failure of one module keeps all new call attempts from succeeding for trunks which are terminated at the failed media gateway. Calls which enter the system as SIP calls, of course, are not subject to this restriction. Media controller 22 may also include various types of redundancy to assure continued operation.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A method for processing a telephone call requesting information from a database, comprising the steps of:

receiving a call at a telecommunications switch from a telephone and transmitting said call to a voice XML network gateway;

selecting a voice channel call center program from within said voice XML network gateway for receiving said call;

initiating a voice-based assistance automation application using a voice interpreter module for automatically providing a voice-based response for requested information for said call;

returning at least one voice-based page to said telecommunications switch relating to said voice-based assistance automation application for automatically providing said voice-based response for requested information;

generating a request from said voice interpreter module to a call center program server for a call center operator to conference into said call for assisting in automatically providing said voice-based response for requested information;

signaling said telecommunications switch to conference said call center operator into said call using said call center program server;

providing a database response of information responsive to a request relating to said call, said database accessible to said call center operator.

2. The method of claim 1, wherein said step of initiating a voice-based assistance automation application further comprises the step of initiating said voice-based assistance automation application using a voice-based mark-up language document.

3. The method of claim 1, wherein said step of generating a request further comprises the step of generating said request using a text-based mark-up language document.

4. The method of claim 1, wherein said requested information comprises a request for directory assistance and further comprising the step of connecting said telephone to a second telephone.

5. The method of claim 4, wherein said requested information comprises a request for directory assistance and further comprising the step of verifying the response to the request for directory assistance prior to connecting said telephone to said second telephone.

6. A method for controlling telecommunications calls from a telecommunications switch associated with a telecommunications network, comprising the steps of:

receiving in a voice interpreter module a plurality of voice telecommunications signals from the associated telecommunications switch, said voice interpreter module associated with a voice XML network gateway, said voice XML network gateway residing on a call center local area network;

receiving in a call center server module a plurality of call center telecommunications data signals from the associated telecommunications switch, said call center server module associated with said voice XML network gateway;

interpreting said voice telecommunications signals using said voice interpreter module in association with at least one speech recognition application;

hosting at least one call center application on said call center server module, said call center sever module residing on said call center local area network;

providing at least one call center service in response to said call center telecommunications data signals using said call center server module in association with said at least one call center application;

generating a request from said voice interpreter module to a call center program server for a call center operator to conference into said call for assisting in automatically providing said voice-based response for requested information;

signaling said telecommunications switch to conference said call center operator into said call using said call center program server; and controlling said step of interpreting said voice signals and said step of providing at least one call center service in response to the flow of telecommunications calls from said telecommunications switch using said voice XML network gateway according to the capabilities of said at least one speech recognition application and said at least one call center application program.

7. The method of claim 6, wherein said step for interpreting said voice telecommunications signals further comprises the step of interpreting said voice telecommunications signals using said voice interpreter module as a voice-based mark-up language document.

8. The method of claim 6, wherein said step of providing at least one call center service further comprises the step of providing said at least one call center service in association with at least one call center application program using a text-based mark-up language document.

9. The method of claim 6, further comprising the step of associating a telephony client between said voice interpreter module and said call center server module for receiving output from said call center server module server for supporting telephony operations associated with said voice telecommunications signals.

10. The method of claim 9, further comprising the step of associating a telephony client between said voice interpreter module and said call center server module for receiving output from said call center server module server relating to the arrival from the telecommunications switch of said voice telecommunications signals.

11. The method of claim 9, further comprising the step of associating a telephony client between said voice interpreter module and said call center server module for receiving output from said call center server module relating to the termination at the telecommunications switch of said voice telecommunications signals.

12. The method of claim 9, further comprising the step of associating a telephony client between said voice interpreter module and said call center server module for receiving output from said call center server module server for mapping said voice telecommunications signals to a plurality of designated speech recognition applications.

13. A system for controlling telecommunications calls from a telecommunications switch associated with a telecommunications network, comprising:

a voice XML network gateway comprising a voice interpreter module and a call center server module, said voice XML network gateway residing on a call center local area network;

said voice interpreter module for receiving a plurality of voice telecommunications signals from the associated telecommunications switch and for generating a request from said voice interpreter module to a call center program server for a call center operator to conference into said call then signaling said telecommunications switch to conference said call center operator into said call using said call center program server;

said call center server module for receiving a plurality of call center telecommunications data signals from the associated telecommunications switch, said call center server module associated with a telecommunications network server;

interpreting circuitry for interpreting said voice telecommunications signals using said voice interpreter module in association with at least one speech recognition application;

call center service providing means for providing at least one call center service in response to said call center telecommunications data signals using said call center server module in association with at least one call center application program; and control circuitry associated with said telecommunications network server for controlling said interpreting circuitry and said call center providing means in response to the flow of telecommunications calls from the telecommunications switch according to the capabilities of said at least one speech recognition application and said at least one call center application program.

14. The system of claim 13, wherein said voice telecommunications signals further comprise a voice-based mark-up language document.

15. The system of claim 13, wherein said at least one call center service uses a text-based mark-up language document.

16. The system of claim 13, further comprising a telephony client between said voice interpreter module and said call center server module for receiving output from said call center server module server for supporting telephony operations associated with said voice telecommunications signals.

17. The system of claim 16, wherein said telephony client between said voice interpreter module and said call center server module receives output from said call center server module server relating to the arrival from the telecommunications switch of said voice telecommunications signals.

18. The system of claim 16, wherein said telephony client between said voice interpreter module and said call center server module receives output from said call center server module server relating to the termination at the telecommunications switch of said voice telecommunications signals.

19. The system of claim 16, wherein said telephony client between said voice interpreter module and said call center server module receives output from said call center server module server for mapping said voice telecommunications signals to designated speech recognition applications.

20. The system of claim 13, wherein said control circuitry associated with said telecommunications network server for controlling said interpreting circuitry and said call center providing means in response to the flow of telecommunications calls from the telecommunications switch according to changes in said capabilities of said at least one speech recognition application and said at least one call center application program.

* * * * *